(12) United States Patent
Levitt et al.

(10) Patent No.: US 11,561,772 B2
(45) Date of Patent: Jan. 24, 2023

(54) LOW-CODE DEVELOPMENT PLATFORM

(71) Applicant: Trixta, Inc., Phoenix, AZ (US)

(72) Inventors: Mark Levitt, Miami, FL (US); Roger John Norton, Capetown (ZA); Barry Worthington Hill, Capetown (ZA)

(73) Assignee: Trixta, Inc., Phoenix, AZ (US)

( * ) Notice: Subject to any disclaimer, the term of this patent is extended or adjusted under 35 U.S.C. 154(b) by 66 days.

(21) Appl. No.: 17/177,921

(22) Filed: Feb. 17, 2021

(65) Prior Publication Data

US 2021/0255842 A1 Aug. 19, 2021

Related U.S. Application Data

(60) Provisional application No. 62/978,241, filed on Feb. 18, 2020.

(51) Int. Cl.

| | |
|---|---|
| *G06F 8/34* | (2018.01) |
| *G06F 8/41* | (2018.01) |
| *G06F 9/451* | (2018.01) |
| *G06F 8/71* | (2018.01) |
| *G06F 9/455* | (2018.01) |
| *G06F 8/36* | (2018.01) |

(52) U.S. Cl.
CPC ............ *G06F 8/34* (2013.01); *G06F 8/44* (2013.01); *G06F 8/71* (2013.01); *G06F 9/451* (2018.02); *G06F 9/45508* (2013.01); *G06F 8/36* (2013.01)

(58) Field of Classification Search
CPC .......... G06F 8/34; G06F 8/36; G06F 8/40–51; G06F 8/71; G06F 9/451; G06F 9/45508
USPC ......... 717/105, 109, 113, 120–121, 136–167
See application file for complete search history.

(56) References Cited

U.S. PATENT DOCUMENTS

| | | | | |
|---|---|---|---|---|
| 5,956,513 | A * | 9/1999 | McLain, Jr. | G06F 8/71 717/145 |
| 2017/0068525 | A1 * | 3/2017 | Johnston | G06F 8/60 |
| 2017/0237692 | A1 * | 8/2017 | Sheth | H04L 51/04 715/758 |

OTHER PUBLICATIONS

Rodeghero, Paige, et al., Detecting User Story Information in Developer-Client Conversations to Generate Extractive Summaries, ICSE '17: Proceedings of the 39th International Conference on Software Engineering, May 2017, pp. 49-59, [retrieved on Nov. 3, 2022], Retrieved from the Internet: <URL:http://dl.acm.org/>.*

(Continued)

*Primary Examiner* — Geoffrey R St Leger
(74) *Attorney, Agent, or Firm* — Fish & Richardson P.C.

(57) ABSTRACT

A computer-implemented low-code development platform is provided including a user interface and having access to a library of step macros configured for user configuration and interconnection via the user interface to generate executable code. Each step macro includes a step configuration generator and an execution code generator. The step configuration generator is configured to generate a step configuration file based on user-configurable data points configurable via the user interface. The execution code generator is configured to generate executable code in the form of a compiled step file configured for storage in memory and execution by a processor of a computing system. The execution code generator receives and inputs the step configuration file into a metaprogramming component configured to interpret the user-configurable data points of the step configuration file and to generate and output the compiled step file.

20 Claims, 10 Drawing Sheets

(56) References Cited

OTHER PUBLICATIONS

Baïna, Karim, et al., Business Process Modelling Augmented—Model Driven transformation of User Stories to Processes, Proc. of the 13th International Conference on Intelligent Systems: Theories and Applications, Sep. 2020, pp. 1-6, [retrieved on Nov. 3, 2022], Retrieved from the Internet: <URL:http://dl.acm.org/>.*

* cited by examiner

FIGURE 7C

LOW-CODE DEVELOPMENT PLATFORM

CROSS-REFERENCE(S) TO RELATED APPLICATIONS

This application claims priority from U.S. provisional patent application No. 62/978,241 filed on 18 Feb. 2020, which is incorporated by reference herein.

FIELD OF THE INVENTION

This invention relates to a software development platform and in particular to a low-code development platform.

BACKGROUND TO THE INVENTION

A low-code development platform is a software platform that provides a software development environment that users can use to create application software through graphical user interfaces and configuration instead of traditional computer programming, often termed "hand coding".

Typically, such platforms may focus on design and development of a particular kind of application: such as databases, business processes, or user interfaces such as web applications. Such platforms may produce entirely operational applications or require additional coding for specific situations. Low-code development platforms may aid in reducing the amount of hand coding, enabling accelerated delivery of business applications. Such platforms may permit a wider range of people to contribute to an application's development as opposed to only those with formal programming skills as may be the case with traditional hand coding. Initial cost of setup, training, and deployment of an application can also be lowered through the use of a low-code development platform.

Existing low-code development platforms may not adequately interpret and display source code schematically in a user interface and there is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented low-code development platform including a user interface and having access to a library of step macros configured for user configuration and interconnection via the user interface to generate executable code, each step macro comprising: a step configuration generator configured to generate a step configuration file, wherein the step configuration file is based on user-configurable data points configurable via the user interface; and an execution code generator configured to generate executable code in the form of a compiled step file configured for storage in memory and execution by a processor of a computing system, wherein the execution code generator receives and inputs the step configuration file into a metaprogramming component configured to interpret the user-configurable data points of the step configuration file and to generate and output the compiled step file.

The step configuration generator may include a step configuration requirements component including fields for receiving data points for configuration of the step macro as well as display and validation rules configured to define how the user interface displays and validates data points input into the fields via the user interface. The display and validation rules may control display of the fields in the user interface and validation of data points input into the fields via the user interface. The step configuration requirements component may generate configuration values based on validated data points, wherein the configuration values are JSON configuration values.

The step configuration generator may include a configuration code generator configured to convert the configuration values into configuration code based on the validated data points. The step configuration generator may be configured to store the step configuration file in a source control repository, wherein the source control repository is a version control repository.

The step configuration generator may include a configuration code interpreter configured to define a graphical element based on the step configuration file, wherein the graphical element is configured for display and user manipulation via the user interface.

The execution code generator may have access to shared functions via a shared library and wherein the execution code generator may receive and inputs one or more shared functions into the metaprogramming component together with the step configuration file in order to generate the compiled step file.

The compiled step file may include one or more execution functions usable in generating one or more of: runtime results, warnings, errors and documentation from the compiled step file.

The user interface may be defined by the step macro and the executable code may be compiled source code in the form of computer program code stored as a series of instructions or commands on a non-transitory computer-readable medium.

In some embodiments, the platform may include a character input component for receiving a sequence of characters representing a user story; a keyword extracting component for extracting, from the sequence of characters, one or more keywords at least including a capability keyword; a flow graph obtaining component for obtaining a flow graph associated with the capability keyword; and, a graphical element output component for outputting the flow graph to the user interface for configuration by a user of each of one or more steps in or added to the flow graph, each of which is associated with a step macro, including configuring user-configurable data points of the step macro for generating a step configuration file based on the user configurable data points.

In accordance with another aspect of the invention there is provided a computer-implemented method of executable code generation using a low-code development platform including a user interface and having access to a library of step macros configured for user configuration and interconnection via the user interface, the method comprising: generating a step configuration file, wherein the step configuration file is based on user-configurable data points configurable via the user interface; and generating executable code in the form of a compiled step file configured for storage in memory and execution by a processor of a computing system, the generating including: interpreting the user-configurable data points of the step configuration file to generate and output the compiled step file.

Generating the step configuration file may include: providing fields for receiving data points for configuration of the step macro; and providing display and validation rules configured to define how the user interface displays and validates data points input into the fields via the user interface.

The method may include generating configuration values based on validated data points, wherein the configuration values are JSON configuration values. The method may also include converting the configuration values into configuration code based on the validated data points.

The method may include storing the step configuration file in a source control repository, wherein the source control repository is a version control repository.

The method may also include defining a graphical element based on the step configuration file, wherein the graphical element is configured for display and user manipulation via the user interface.

The method may include accessing shared functions via a shared library and wherein generating executable code receives and inputs one or more shared functions together with the step configuration file for interpreting in order to generate the compiled step file.

Interpreting the user-configurable data points of the step configuration file may include interpreting the user-configurable data points of the step configuration file with the step macro file to generate and output the compiled step file.

In some embodiments, the method may include receiving a sequence of characters representing a user story; extracting, from the sequence of characters, one or more keywords at least including a capability keyword; obtaining a flow graph associated with the capability keyword; and, outputting the flow graph to the user interface for configuration by a user of each of one or more steps in or added to the flow graph, each of which is associated with a step macro, including configuring user-configurable data points of the step macro for generating a step configuration file based on the user configurable data points.

In accordance with a further aspect of the invention there is provided a computer program product for executable code generation using a low-code development platform including a user interface and having access to a library of step macros configured for user configuration and interconnection via the user interface, the computer program product comprising a computer readable storage medium having program instructions embodied therewith, the program instructions executable by a processor to cause the processor to: generate a step configuration file, wherein the step configuration file is based on user-configurable data points configurable via the user interface; and generate executable code in the form of a compiled step file configured for storage in memory and execution by a processor of a computing system, the generating including interpreting the user-configurable data points of the step configuration file to generate and output the compiled step file.

Further features provide for the computer-readable medium to be a non-transitory computer-readable medium and for the computer-readable program code to be executable by a processing circuit.

In accordance with another aspect of the invention, there is provided a computer-implemented method for executable code generation comprising: receiving a sequence of characters representing a user story; extracting, from the sequence of characters, one or more keywords at least including a capability keyword; obtaining a flow graph associated with the capability keyword; and, outputting the flow graph to a user interface for configuration by a user of each of one or more steps in or added to the flow graph, each of which is associated with a step macro, including configuring user-configurable data points of the step macro for generating a step configuration file based on the user configurable data points.

Receiving the sequence of characters may include receiving the sequence of characters in the form of a string or other suitable data type.

Extracting the one or more keywords from the sequence of characters may include extracting one or both of a role keyword and a benefit keyword. Extracting the one or more keywords may include using a language model to extract the keywords. Extracting the one or more keywords may include outputting a data structure including the keywords. The data structure may be a schema (such as a JSON schema, an XML schema or the like) which maps each of the one or more keywords to one of a role or action.

Obtaining the flow graph associated with the capability keyword may include generating the flow graph. Obtaining the flow graph may include obtaining an empty flow graph which includes no steps.

Obtaining the flow graph may include associating the flow graph with a role based on a role keyword extracted from the sequence of characters. Associating the flow graph with a role may include assigning the flow graph to the role. Associating the flow graph with a role may include configuring identity management for resources of the flow based on the role.

The method may include identifying one or more step macros for one or more steps for inclusion in the flow graph, each of the one or more step macros being associated with the user story and identified based on the one or more keywords.

The method may include determining routing or branching information for the step based on the one or more keywords. The method may include rendering and interconnecting the one or more steps visually as graphical elements in a flow graph editor, wherein each step includes fields for input of user-configurable data points.

Identifying one or more step macros may include using a learning component having been trained by matching steps in flows in historical flow graphs. Identifying one or more step macros may include using a wizard component and user input received via the wizard component.

In accordance with an aspect of the invention there is provided a computer-implemented low-code development platform comprising: a character input component for receiving a sequence of characters representing a user story; a keyword extracting component for extracting, from the sequence of characters, one or more keywords at least including a capability keyword; a flow graph obtaining component for obtaining a flow graph associated with the capability keyword; and, a graphical element output component for outputting the flow graph to a user interface for configuration by a user of each of one or more steps in or added to the flow graph, each of which is associated with a step macro, including configuring user-configurable data points of the step macro for generating a step configuration file based on the user configurable data points.

In accordance with another aspect of the invention, there is provided a computer program product for executable code generation, the computer program product comprising a computer readable storage medium having program instructions embodied therewith, the program instructions executable by a processor to cause the processor to: receive a sequence of characters representing a user story; extract, from the sequence of characters, one or more keywords at least including a capability keyword; obtain a flow graph associated with the capability keyword; and, output the flow graph to a user interface for configuration by a user of each of one or more steps in or added to the flow graph, each of which is associated with a step macro, including configuring user-configurable data points of the step macro for generating a step configuration file based on the user configurable data points.

Further features provide for the computer-readable medium to be a non-transitory computer-readable medium and for the computer-readable program code to be executable by a processing circuit.

Embodiments of the invention will now be described, by way of example only, with reference to the accompanying drawings.

BRIEF DESCRIPTION OF THE DRAWINGS

In the drawings:

FIG. 7C is a schematic diagram which illustrates a data point configuration tab of the user interface of FIG. 7A;

DETAILED DESCRIPTION WITH REFERENCE TO THE DRAWINGS

Figure 1:
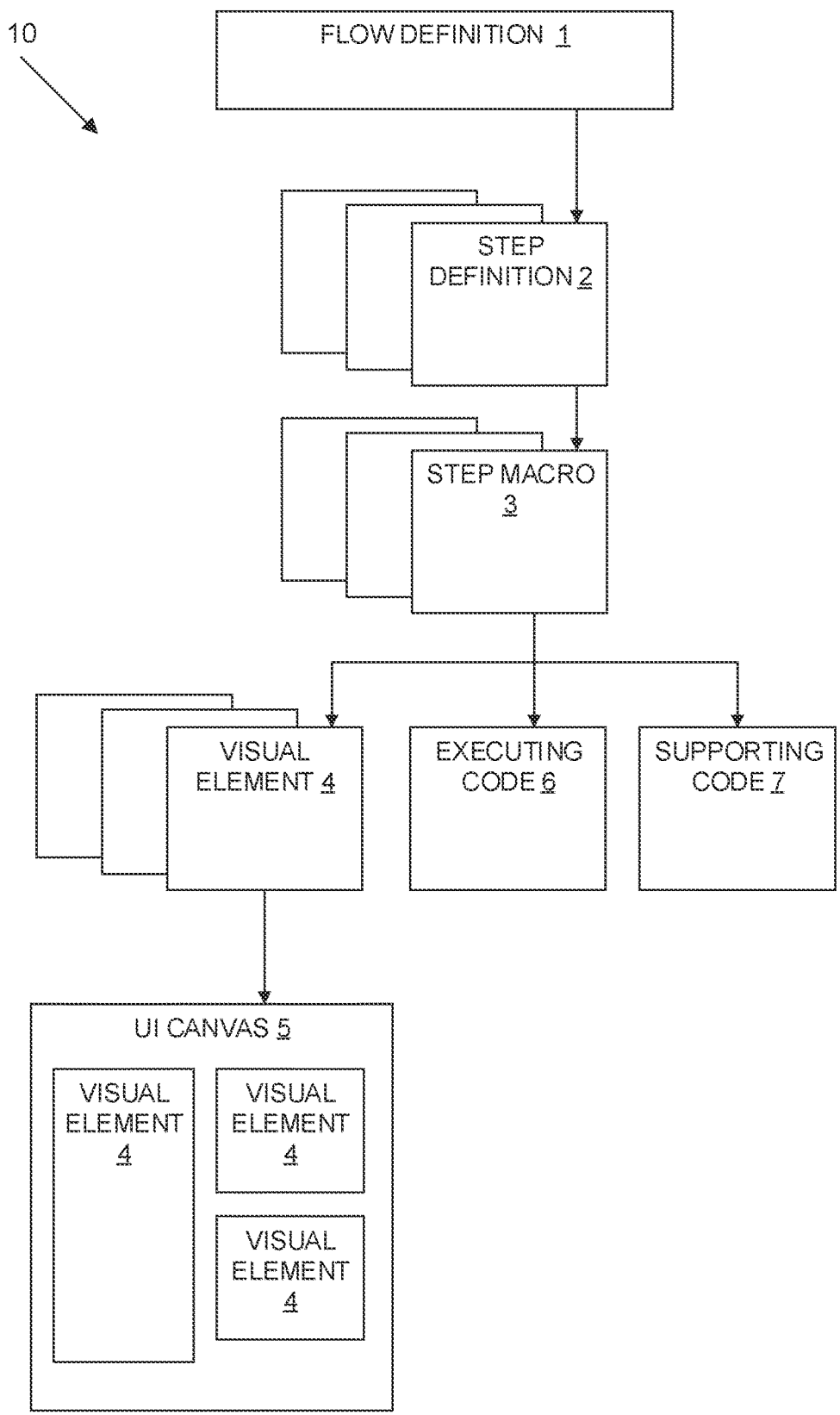
FIG. 1 is a schematic diagram which illustrates an example embodiment of flow definition as developed by a low-code development platform according to aspects of the present disclosure.

Aspects of the present disclosure provide a low-code development platform for developing or creating application software. The low-code development platform described herein may be configured to separate a control flow (being the order in which source code or executable code based on the source code is executed) from the actual execution of the source code/executable code so as to enable a user to define one without the other. In other words, to define the order of flow separately from what is actually executed. In the control flow definitions, characteristics are defined relevant to visual display of the control flow.

Embodiments of the low-code development platform described herein may include a user interface and a library of step macros.

The user interface may define a bounded context (referred to as a space or operating space) in which roles and actions, and ultimately the application software, relating to a functional unit within an organization, for example, can be described. The bounded context may be represented graphically in the user interface as a circle or other shape to which and in which actions or roles may be added and configured. The user interface includes functionality for managing actions and roles. The user interface may include functionality for managing actions against a role, setting permissions for a role, assigning users to one or more roles and the like. Managing actions against roles may allow for control as to which users can call which actions (based on the role to which they are assigned). The user interface may include functionality for connecting an action to a flow graph and in turn assigning one or more roles to a flow graph. Each flow graph may be built up with a number of steps, each of which is based on a step macro.

A step macro may be made up of one or more files each of which including one or more functions. In some cases, a step macro may also refer to other files (that are not a part of the step macro) during compilation. Each step macro may be configured for user configuration and interconnection via the user interface to generate source code and/or executable code. Step macros may be configured and interconnected in the user interface to build a flow graph. The flow graph may be a visual flow that is drawn in the user interface and displays how various steps in the flow reference each other. Each step in a flow may be an instance of a type of step macro that can be interconnected with other steps (being instances of the same or other types of macros) and configured via the user interface. Each step may be associated with a block of executable code which may form a part of a larger body of code (e.g., being a particular computer program or application software that is being developed), which may include executable code of multiple steps in a flow. The flow graph may be a schematic representation of source code and/or executable code that is generated through configuration and interconnection of step macros.

Each flow graph may be a definition of the following components:
1) Visual instructions on how the client should display them;
2) The control flow with order of steps with each step defining what to call next (such as a branches field, an inner routing field and a settings field, etc.); and
3) The code modules to execute before proceeding (such as the code modules to execute in combination with the configuration values before proceeding).

The visual instructions and the control flow may be combined and leveraged to allow for the visual modelling and defining of the logic of the code around the modules that are actually executed.

The low-code development platform described herein may be configured to derive a visual representation of code, the flow graph, from the code itself. The concept of the overall method is illustrated with reference to the schematic representation (10) of FIG. 1.

A flow definition (1) includes step definitions (2) in the form of configured and interconnected step macros (3), which are represented in step configuration files, each of which may include general fields (e.g., general across all steps) and additional settings according to the type of step. The step macros (3) may be used to display visual elements (4) arranged on a user interface canvas (5), to provide code used when generating executing code (6) with adherence to step interfaces, and to provide supporting code (7) for adherence to step behavior and auxiliary features. The visual elements (4) may include rules for how a user interface should display a step. The executing code (6) may include code required to combine with the configuration that is compiled into the running code. The supporting code (7) may be used for other services, such as testing, visual overlays, or additional metaprogramming.

A flow graph itself may be primarily concerned with displaying how different blocks of code execute in relation to each other so that a user can compose the logic of the software without necessarily concerning themselves with the practicalities of how it will be implemented in the end. With the logic in place, the user can reason and infer whether the 'what' is correct before tackling the 'how' (through the configuration of steps).

Steps in a flow graph can execute relative to other steps, for example either serially or parallel to other steps. Steps, through configuration and/or interconnection of the relevant step macro can be configured to branch (or route), receive input (e.g., from a previous or another step in the flow graph) and output a result (e.g. to a following or another step in the flow graph). Steps can thus be configured via configuration and/or interconnection of step macros by defining variables (e.g., by inputting data points into fields). Routing or branching of steps may be configured by interconnection of a step to other steps in the flow graph. Steps may be configured to terminate or end, e.g., such as: with exit; recursive with exit; recursive without exit; endless (stream), or the like.

The configuration or characteristics of a step in the flow graph may be defined in source code that is generated by the step macro (e.g., by a configuration code generator) based on validated data points input via the user interface.

The configuration of step macros according to aspects of the present disclosure may facilitate easily building out complex functionality and reuse while only needing to consider the configuration of that specific implementation. Step macros may be stored in a library accessible to all or some users (e.g., based on credentials and associated rights management) of the low-code development platform to allow use and configuration by any user of the platform.

Some embodiments of step macros described herein include configuration logic and validation rules, enabling a simplified frontend which interprets relevant fields and rules. The configuration of step macros according to aspects of the present disclosure allow for changes to a step macro to be used immediately in a user interface as there is no coupling between the frontend and backend code. That is, the frontend is provided all the information needed by the backend at runtime in order to configure step macros via the frontend. In summary, no updates are needed to the frontend if new step macros are added to the backend.

Embodiments of the platform described herein may further be configured to store configured step macros (e.g., in the form of step configuration files) in a source control repository, such as a version control repository. The platform may thus keep a record of every version of every instance of configured step macros.

Some embodiments of the present disclosure provide step macros configured to facilitate the inclusion of multiple execution functions in a compiled step file which includes executable code generated from a configured step macro (step configuration file). Providing multiple execution functions in a compiled step file may permit for additional functionality and outputs from the compiled step file that may traditionally not be possible from compiled code. In some implementations, execution and supporting functions may be standardized across all step macros to enable generation of additional tools and functionality in the frontend that would traditionally need to be done by a completely different system (such as a testing or linting framework).

It should be appreciated that source code for a given application may be represented by a number of flow graphs. Each flow graph may reference one or more other flow graphs. For example, a flow graph may receive as input the output of another flow graph and vice versa. One flow graph may for example be nested within another flow graph. The low code development platform described herein therefore provides for the interconnection of one flow graph to another.

In some cases, each flow graph may be associated with a role of an end-user of the application software that is being developed. In some cases, flow graphs may be associated with a role of a user of the platform responsible for developing the application software (or a system-based user). A flow graph may for example relate to a capability of a user or end-user having the role with which the flow graph is associated. Associating a flow graph with a role may include implementing access control to resources or elements associated with the flow graph. Example resources or elements include computer-managed files, notes, tasks, and instant messaging chat in the form of private one-on-one chat rooms, as well as group chat rooms and the like. The access control may limit access to only users or end-users having the role with which the flow graph is associated. Access control may be implemented using identity management (IdM) protocols (which may also be termed identity and access management (IAM or IdAM) protocols. Such protocols may be configured for identifying, authenticating, and authorizing individuals who will be utilizing resources associated with the flow graphs.

Figure 2:
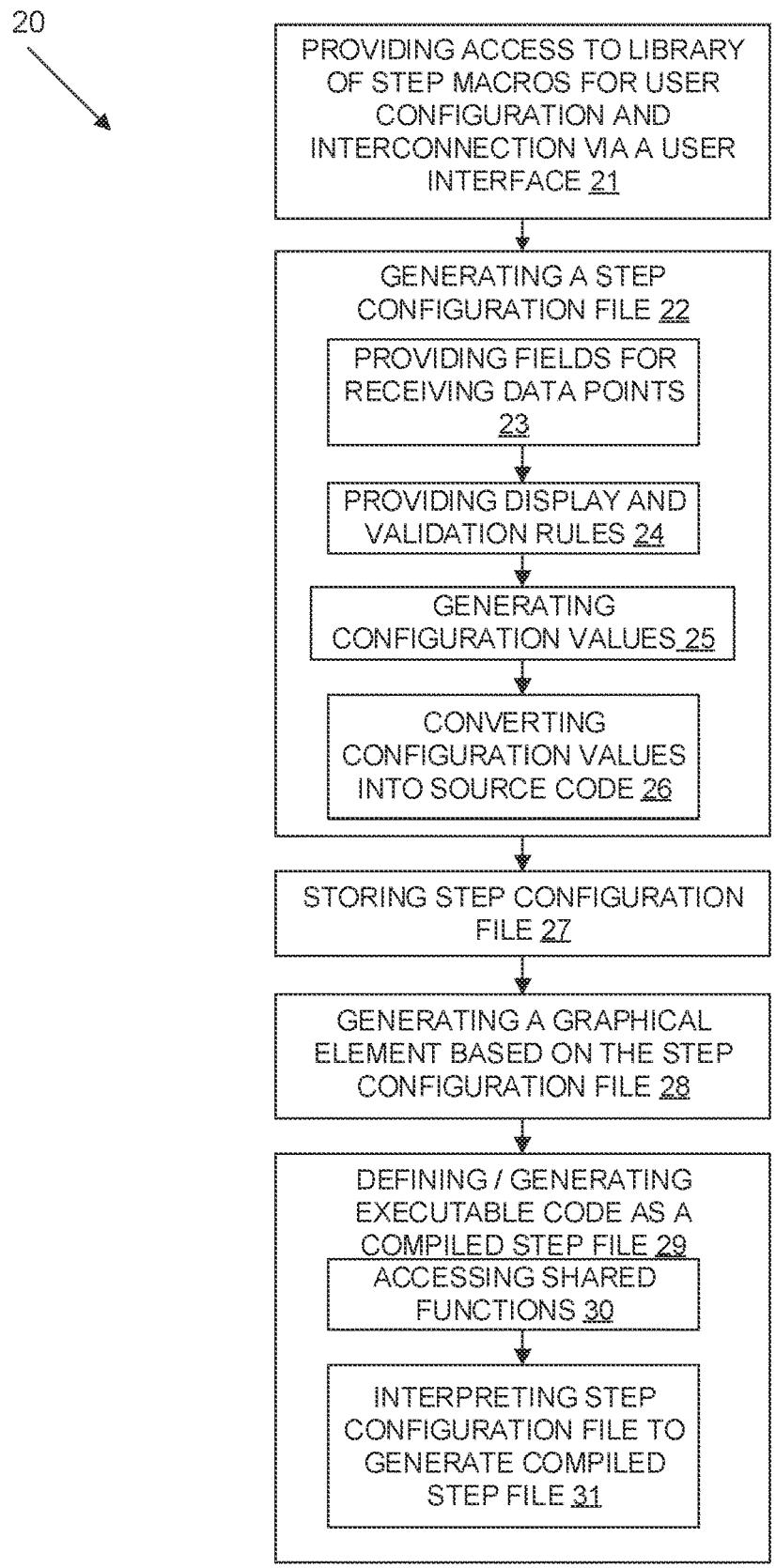
FIG. 2 is a flow diagram which illustrates an example embodiment of method provided by a low-code development platform according to aspects of the present disclosure.

Referring to FIG. 2, a flow diagram (20) illustrates an example embodiment of the described computer-implemented method of executable code generation using a low-code development platform including a user interface. The method has access (21) to a library of step macros configured for user configuration and interconnection via the user interface.

The method at the platform includes generating (22) a step configuration file, which is based on user-configurable data points configurable via the user interface. The generating process generally includes: providing (23) fields for receiving data points for configuration of the step macro; providing (24) display and validation rules configured to define how the user interface displays and validates data points input into the fields via the user interface (e.g. by controlling display of the fields in the user interface and validating data points input into the fields via the user interface); generating (25) configuration values (such as JSON configuration values) based on validated data points; and converting (26) the configuration values into configuration code based on the validated data points. The step configuration file may include the configuration code. The configuration code may be a JSON configuration file configured for validation using a suitable JSON validator. The method stores (27) the step configuration file in a version control repository.

Graphical elements are defined and/or generated (28) based on the step configuration files and the graphical elements are configured for display and user manipulation via the user interface.

The method then generates (29) executable code in the form of a compiled step file configured for storage in memory and execution by a processor of a computing system. The executable code may be compiled source code, such as object code, bytecode, machine code or the like. The executable code may for example be in the form of computer program code stored as a series of instructions or commands on a non-transitory computer-readable medium.

The generating (29) process includes accessing (30) shared functions via a shared library and the generating process receives and inputs one or more shared functions together with the step configuration file for interpreting in order to generate the compiled step file. The generating (29) process also includes interpreting (31) the user-configurable data points of the step configuration file to generate and output the compiled step file. Interpreting the user-configurable data points of the step configuration file may include interpreting the user-configurable data points of the step configuration file with the step macro file to generate and output the compiled step file.

Figure 3A:
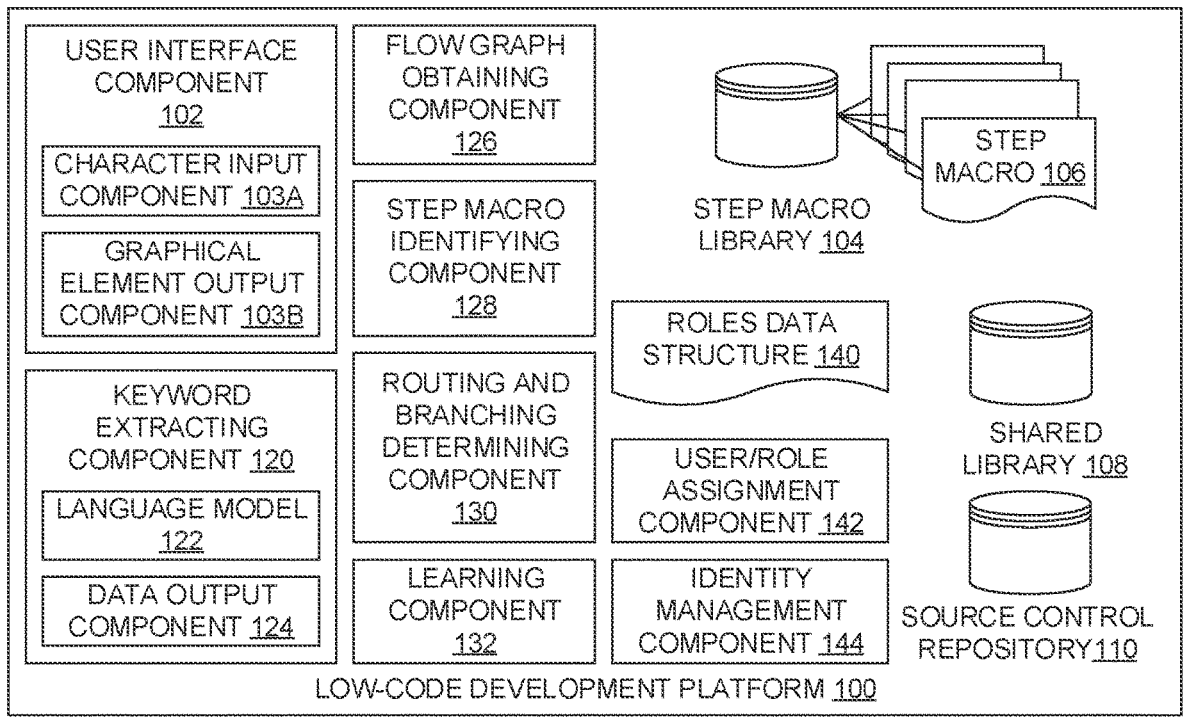
FIG. 3A is a schematic diagram which illustrates an example embodiment of a low-code development platform according to aspects of the present disclosure.

FIG. 3A is a schematic diagram which illustrates an example embodiment of a low-code development platform (100) according to aspects of the present disclosure. The low-code development platform (100) may be a computer implemented platform configured to execute on one or more processors of a computing system. The various components or modules of the platform may be stored in memory of a computing system, such as a distributed or cloud-based computing system.

Figure 7A:
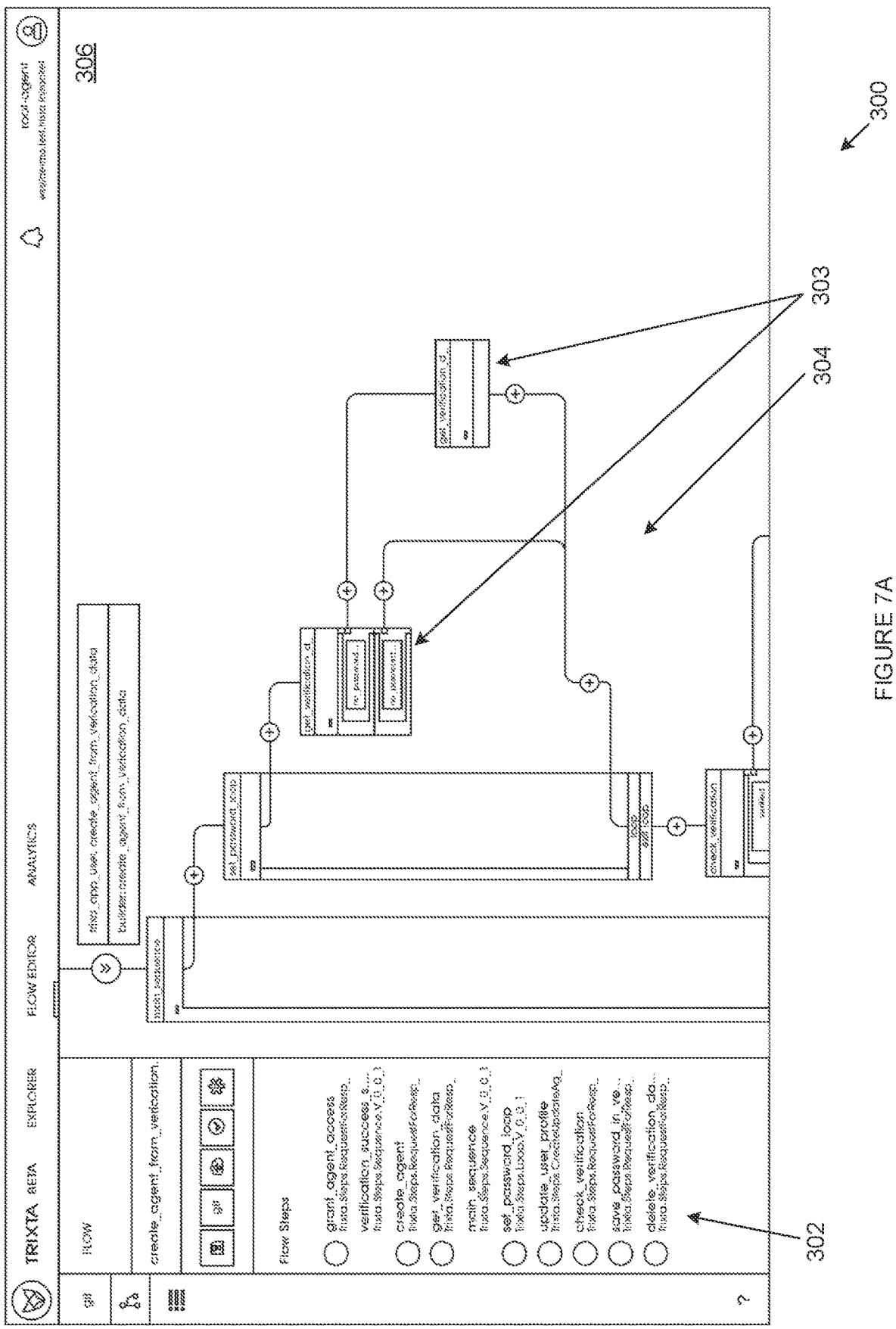
FIG. 7A is a schematic diagram which illustrates an example user interface according to aspects of the present disclosure.
Figure 7B:
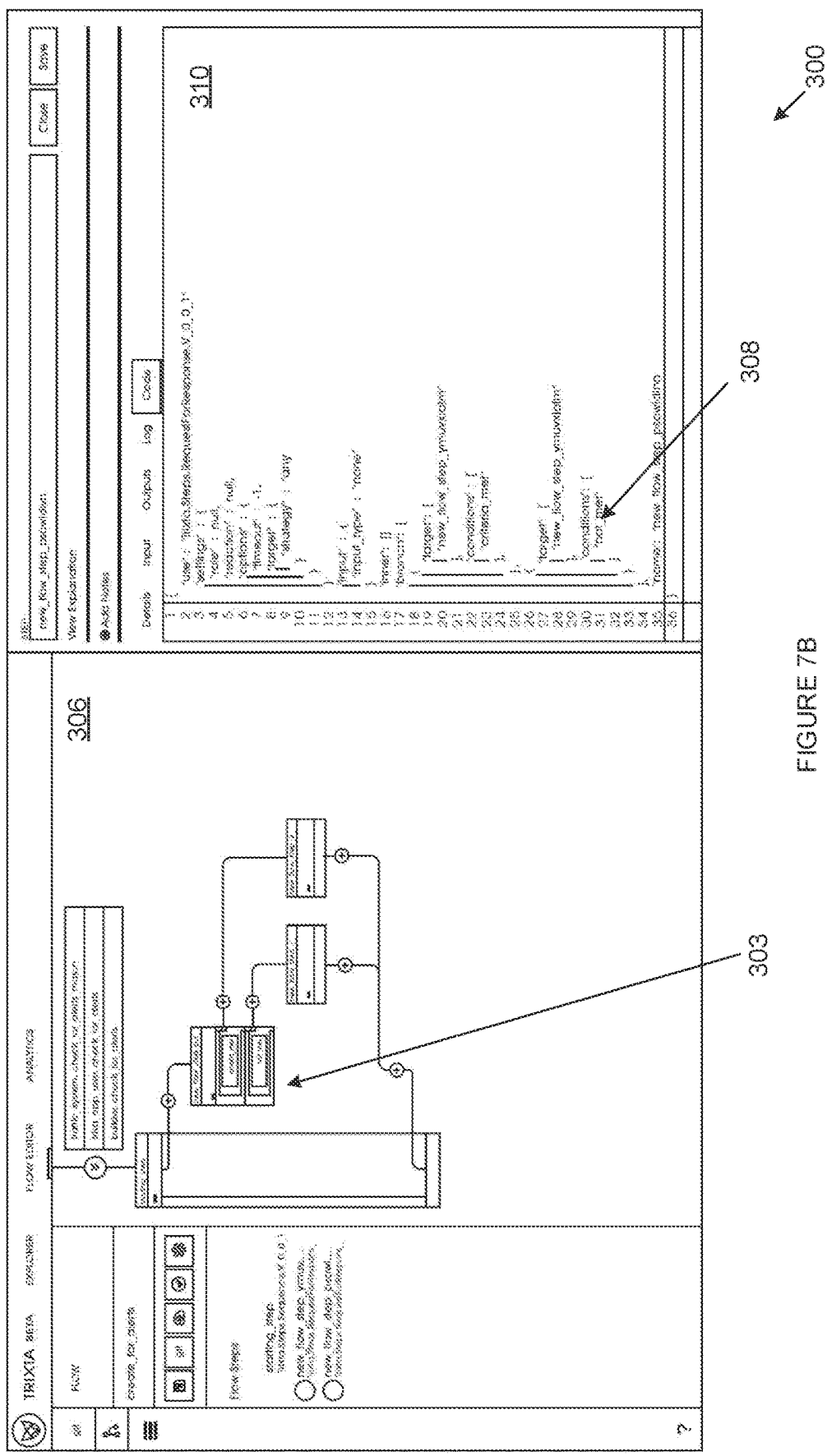
FIG. 7B is a schematic diagram which illustrates another configuration of the user interface of FIG. 7A.
Figure 7C:
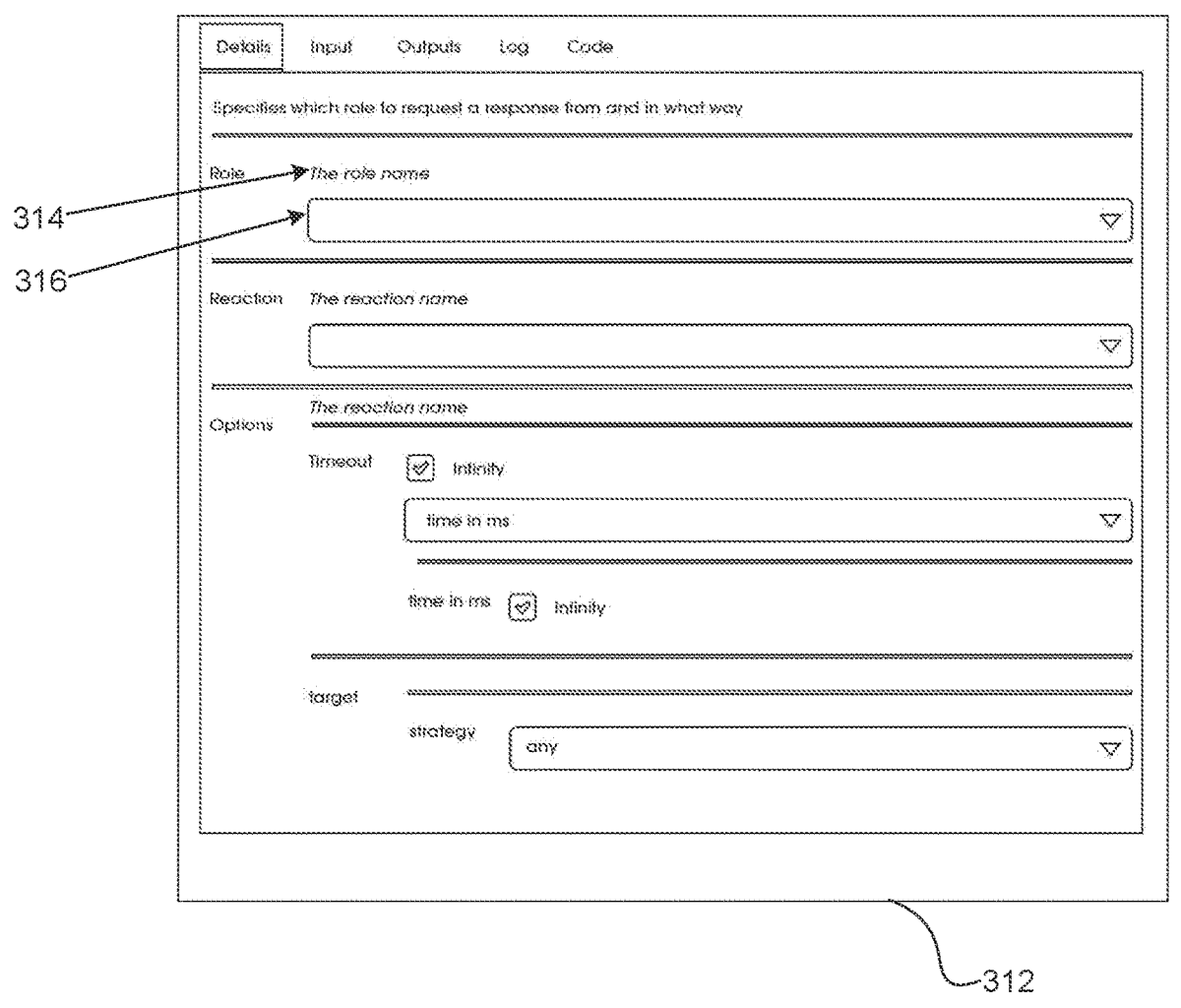

The platform (100) may include a user interface component (102) configured to provide a user interface, such as a graphical user interface, one example of which is illustrated in FIGS. 7A to 7C. The user interface, or at least aspects of the user interface, may be defined by the step macro.

The user interface may be a web-based user interface displayable via a suitable adaptor (such as a display adaptor and display) in communication with a computing system on which the platform executes. The user interface component (102) may provide configuration for rendering and displaying graphical elements of the platform to the user and for receiving user input via, e.g., an I/O controller of the computing system. The user interface may provide a front end via which a user interfaces with the platform.

The user interface may be a frontend and may be displayed in a web browser. The user interface may provide functionality for: rendering of settings, such as the fields for values of step macros that can be configured; editing the step configuration file (e.g., to allow a user to make a change to the values and save them); and, render the steps in a flow graph.

In the illustrated embodiment, the user interface includes a character input component (103A) configured to receive a sequence of characters input by a user of the platform. The sequence of characters may be in the form of a string or other suitable data type. The sequence of characters may relate to a user story. A "user story" is typically an informal, natural language description of one or more features of a software system. User stories are often written from the perspective of an end user or user of a system. For example: "As a <role> I can <capability>, so that <receive benefit>". In other embodiments, the sequence of characters may be received from another component or interface. For example, in some embodiments, the platform may include a component or interface for receiving a sequence of characters representing a user story having been extracted from technical documentation (such as scope documentation, etc.) or the like. The extraction may be performed by a suitably configured user story extraction component, which may for example implement natural language processing (NLP) techniques.

The user interface may include a graphical element output component (103B) arranged to output graphical elements for display, such as steps, flows, spaces and other such elements making up the user interface of the platform (102).

The platform (100) may include a keyword extracting component (120) configured to extract one or more keywords from a sequence of characters. The extracting component may be configured to extract keywords including one or more of: a capability keyword; a role keyword and a benefit keyword. The extracting component (120) may have access to a language model (122) which is configured to extract the one or more keywords from the sequence of characters. The language model (122) may be an autoregressive language model, such as Generative Pre-trained Transformer 3 (or "GPT-3"), an NLP model, or the like. The extracting component (120) may include a data output component (124) configured to output a data structure including the keywords. The data structure may be a schema (such as a JSON schema, an XML schema or the like) which maps each of the one or more keywords to one of a role, benefit or action based on the type of keyword.

The platform (100) may include a flow graph obtaining component (126) configured to obtain a flow graph associated with the capability keyword. The flow graph obtaining component (126) may be configured to generate the flow graph. In some cases, e.g., where a role keyword is extracted from the character sequence, the flow graph obtaining component (126) may be configured to associate the flow graph with a role based on the role keyword extracted from the sequence of characters. Associating the flow graph with a role may include assigning the flow graph to the role. Associating the flow graph with a role may include configuring identity management for resources of the flow based on the role. The flow graph obtaining component (126) may use the graphical element output component (103B) to output the flow graph to the user interface. The flow graph may be output for configuration by a user of each of one or more steps in or added to the flow graph.

In some embodiments, the platform may include a step macro identifying component (128) arranged to identify one or more step macros for one or more steps for inclusion in the flow graph. Each of the one or more step macros may be associated with the user story and identified based on the one or more keywords. The platform may include a routing and branching determining component (130) for determining routing or branching information for the step based on the one or more keywords. The platform may use the graphical element output component (103B) to render and interconnect the one or more steps visually as graphical elements in a flow graph editor. The step macro identifying component (128) and routing and branching determining component (130) may use a learning component (132) including a learning algorithm having been trained by matching steps in flows in historical flow graphs. The step macro identifying component (128) and routing and branching determining component (130) may also use a wizard component which determines likely step macros for presentation to and selecting by a user as well as the user input relating to the relevant selection to identify the step macros and determine the routing/branching information.

The platform (100) may include or have access to a library (104) of step macros (106). The step macro library (104) may be a database or other collection of step macros stored in memory and accessible to the platform (100).

The platform (100) may include or have access to a shared library (108) in and from which a collection of shared code, functions and other resources (such as configuration data, documentation, help data, message templates, pre-written code and subroutines, classes, values or type specifications) may be stored and accessed. The shared library (108) may include shared enhancement and convenience functions, such as a set of functions that are commonly used across all step types that form part of the platform.

The platform (100) may include or have access to a source control repository (110). The source control repository may be a repository maintained or controlled by a suitable version or revision control system. The source control repository may be any suitable data structure configured to store one or both of the files and metadata for the files or directory structure storing the files. In the case of a distributed version control system (such as Git), the whole set of information in the source control repository may be duplicated over a plurality of computing systems. Example metadata includes one or more of: a historical record of changes in the source control repository; a set of commit objects; and, a set of references to commit objects (sometimes called heads).

The platform (100) may provide functionality for configuring and interconnecting step macros via a user interface or another program to build a flow graph, being a schematic representation of source code and/or executable code that is generated as a result of the configuration and interconnection of the step macros. In some implementations, the platform (100) may include one or more artificial intelligence-based modules arranged to configure and/or interconnect step macros based on user input, for example in the form of descriptions of required functionality, etc. input into the platform via voice, text or the like. A step macro may be a file that includes code required for using, configuring and/or interconnecting a step in the user interface in order to build a flow graph. There may be a variety of different types of step macros. Each step macro may be generic and capable of use through configuration for all steps of that particular type. A configured and/or interconnected step macro may be termed a step configuration file and may be a specific instance of the step macro displayed in the user interface. Representation of a configured and/or interconnected step macro in a flow graph displayed via the user interface may be termed a step.

The platform (100) may include a roles data structure (140) in which a list of different roles and their associated attributes, permissions, resources and the like may be maintained and configured. The platform (100) may include a user/role assignment component (142) which assigns each user to one or more roles. The platform (100) may include an identity management component (144) which implements suitable identity management protocols to restrict each user to the role (and its associated attributes, permission, resources, etc.) to which that user is assigned.

Figure 3B:
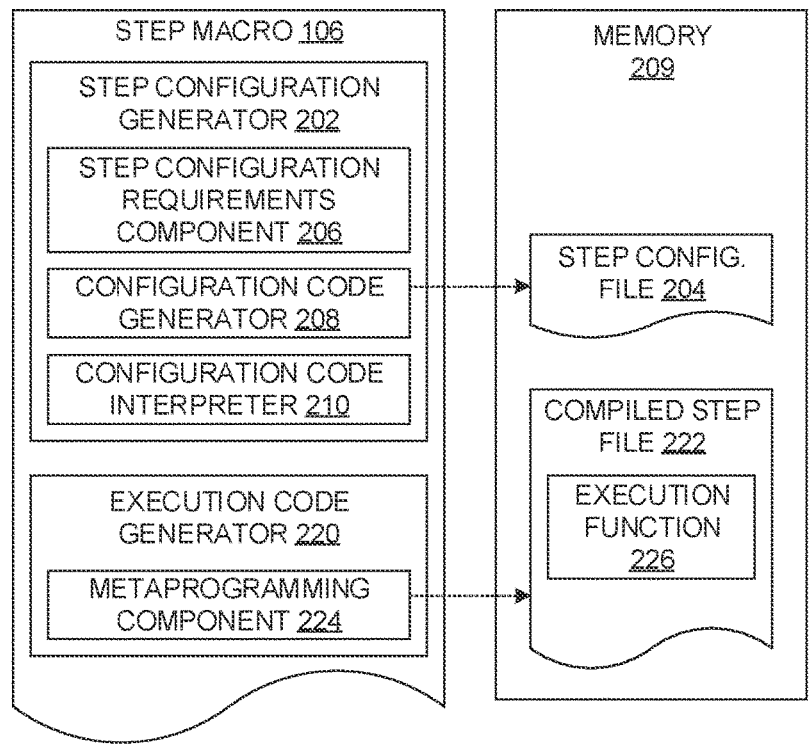
FIG. 3B is a schematic diagram which illustrates an example step macro according to aspects of the present disclosure.

FIG. 3B is a schematic diagram which illustrates components of an example step macro (106) according to aspects of the present disclosure. A step macro (106) may be a file or other suitable data structure that includes code configured for using, manipulating and configuring a particular step type. The same file may be used for all steps of that type, but the step configuration for a specific instance of the step macro may be applied when displaying the step in a user interface.

The step macro (106) may be made up of two main parts, a step configuration generator (202) for producing a step configuration file (204) and an execution code generator (220) for producing executable code in the form of a compiled step file (222).

The step configuration generator (202) may be configured to generate a step configuration file (204) and may include one or more blocks of code that relate to (and, e.g., control or regulate) the configuration of the step macro to produce a step configuration file.

The step configuration generator (202) may include a step configuration requirements component (206). The step configuration requirements component (206) may include fields for receiving data points for configuration of the step macro. The step configuration requirements component may include display and validation rules. The display and validation rules may be configured to define how the user interface displays and validates data points input into the fields via the user interface. In some implementations, the display and validation rules may be configured to control display of the fields in the user interface and validation of data points input into the fields via the user interface. Example characteristics that can be configured via graphical rendering of the fields include characteristics relating to input, output and the like.

The step configuration requirements component (206) may define step configuration requirements that may be used to render a form in the user interface of what fields specifying the data points required from a user as well as a set of rules on how the user interface should display those field types. The step configuration requirements component (206) may be configured to check and/or validate values edited in the user interface. The values or data points may be checked against validation rules (based on, e.g., a JSON validator) before being passed to include a configuration code generator (208).

In some embodiments, the step configuration requirements component (206) generates configuration values based on validated data points. The configuration values may for example be JSON configuration values.

The step configuration generator (202) may include a configuration code generator (208) configured to convert the configuration values into configuration code based on the validated data points. The configuration code generator (208) may use JSON configuration values to produce the step configuration file (i.e., a file that represents the step configuration, which may be a particular instance of a step macro).

The step configuration file (204) may include or be based on the configuration code generated by the configuration code generator. The configuration code generator (208) may be configured to receive an edited step configuration (e.g., in JSON) and convert it into code (e.g. Elixir code, or the like) as a step configuration file.

The step configuration generator (202) may be configured to store the step configuration file (204) in memory (209) of a computing system and/or in a source control repository (110), such as a revision or version control system repository.

The step configuration generator (202) may include a configuration code interpreter (210) configured to define and/or generate a graphical element based on the step configuration file. The configuration code interpreter may for example be configured to interpret and render graphically 'branch' and 'inner_routing' references in a step configuration file in order to render and display a visual flow graph. The graphical element may be configured for display and manipulation (e.g., dragging, dropping, moving, deleting, interconnecting, etc.) by a user via the user interface. The configuration code interpreter may include code that converts the step configuration file into a format required for the user interface to display the flow graph. The logic of what is shown in the flow graph may therefore be defined by the step macro (or the configuration code interpreter of the step macro).

The step configuration file (204) may be based on user-configurable data points configurable via the user interface. Different configurations of the same step macro may result in different step configuration files, each being a unique instance of the step macro. The step configuration file may be a data structure that contains information that captures the user's intent which would in turn alter the behavior of the step depending on the values set. These values are set via the user interface, which is provided and facilitated by the macro's step configuration generator (202). The step configuration file (204) may be combined or input into an execution code generator (220) to produce working (or executable) code.

The step configuration file (204) may be an auto-generated code file (e.g., Elixir code file) that includes all of the configuration values, rules, logic, etc. for an instance of a step. The step configuration may be the output of a JSON step configuration in code, such as Elixir code.

A step macro's current configuration state, i.e., an instance of the step macro as represented by the step configuration file, can be saved to a repository that records its current state. This can then be loaded and viewed in any integrated developer environment (IDE).

The step macro (106) may include an execution code generator (220) which may include a metaprogramming component (224). The execution code generator (220) may be configured to generate executable code in the form of a compiled step file (222) configured for storage in memory (209) and execution by a processor of a computing system.

The execution code generator (220) may be configured to receive the step configuration file (204) from memory (209) and/or the repository (110). The execution code generator (220) may be configured to input the step configuration file into the metaprogramming component (224).

In some embodiments, the execution code generator (220) may have access to shared functions via a shared library (108). The execution code generator (220) may be configured to receive and input one or more shared functions accessed from the shared function library (108) into the metaprogramming component (224) together with the step configuration file.

In some embodiments, the execution code generator (220) may have access to step specific functions (e.g., functions that have been added to this specific step macro) and may be configured to input these step specific functions into the metaprogramming component.

The metaprogramming component (224) may include metaprogramming functions, such as code that is configured to combine the step configuration file (204) with any shared functions and step specific functions to generate the compiled step file (222). The metaprogramming component (224) may be configured to interpret user-configurable data points of the step configuration file and to generate and output the compiled step file (222). In some implementations, the metaprogramming component may be configured to generate source code and to compile the generated source code into the compiled step file.

The compiled step file (222) may include one or more execution functions (226) usable in generating one or more of: runtime results, warnings, errors and documentation from the compiled step file. The execution functions (226) may be functions that are used in the compiled step file to generate various outputs. Each execution function may be configured to be used for a different purpose when run while still applying the same step configuration.

Execution of the compiled step file (222) by a processor may generate compiled step output. The compiled step output may be used by tests, auto generate documentation, display warnings, show dependencies, or create actual results. The compiled step output enables additional information and results to output from a step by running it in different ways or modes. The compiled step outputs may be output by execution of the execution functions, each execution function, when executed, outputting a compiled step output.

To route effectively, each compiled step file (222) may generate a result that is a tuple of two values, such as one or both of a tag and data. The tag and/or data may be defined in the compiled step file. For example, the compiled end result may include lines of code that emit specific tags and a data packet alongside it during execution.

One or both of the tags and data may be dynamic and may be based on one or both of the step type and step configuration. The step macro step may be configured to indicate, e.g., via the user interface to communicate at design time which tags would be emitted during runtime.

The tag may be a summary of an outcome. The tag may be a human-readable value selected for easy comprehension (e.g., so that it is easy to understand by those only interested in what the flow is doing). The data may for example include information that is processed by a subsequent step (and may therefore relate to the current 'how' and associated requirements of the current implementation). The tag may be used to summarize the outcome/result of the step in a phrase. This encourages developers and designers to emit a level of information that is useful in designing flow logic and rapidly understand without necessarily needing to look at the data itself. The routing code will take a list of items, each potentially have one or many tags to match with a destination (a single step, or sequence of steps). These values may be used to generate a case function, using pattern matching and a custom 'guard' which will check whether the tag is in a list of values, and if so the pattern matches and the path is taken, resulting in either running subsequent destination steps and returning or exiting and returning control to the calling code.

Figure 4:
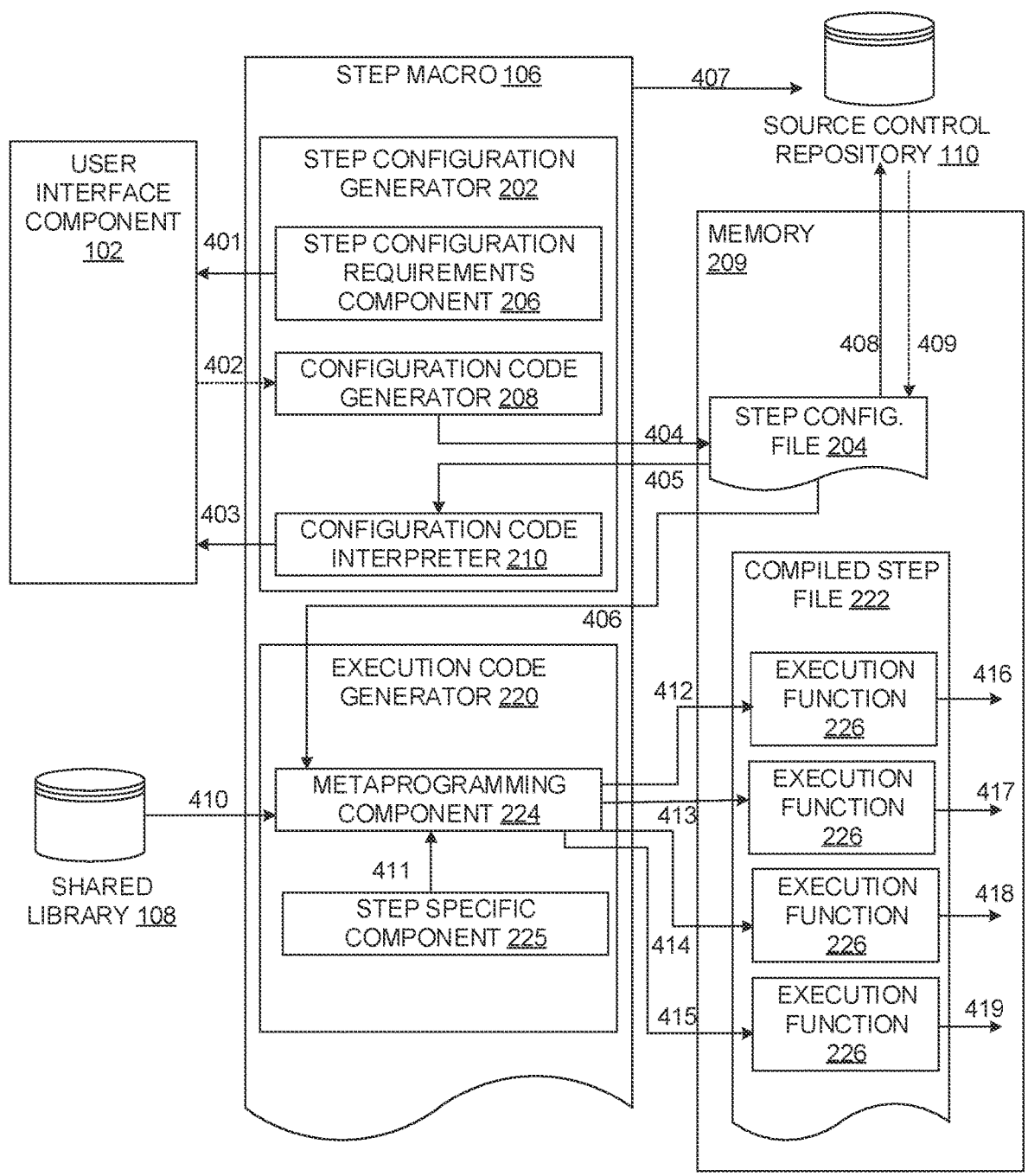
FIG. 4 is a schematic diagram which illustrates an example embodiment of a low-code development platform showing a process according to aspects of the present disclosure.

Referring to FIG. 4, an example method is illustrated between the components of the low-code development platform (100) shown in FIGS. 3A and 3B.

As discussed, the step macro (106) is made up of two main parts, one concerned with producing a step configuration file (204), and the other concerned with producing executable code in the form of a compiled step file (222). The step configuration file (204) is a piece of data that includes useful information that captures the user's intent which would in turn alter the behavior of the compiled step file (222) depending on the values set. These values may be set via the user interface component (102), which is provided and facilitated by the step configuration generator (202).

The compiling process may be carried out as follows. First, the step macro may be loaded and a form is rendered (401) in the user interface rendering settings by the step configuration requirements component (206) of what configuration fields are required from a user as well as a set of rules on how the user interface should display those field types. Values are edited (402) in the user interface and checked against the validation rules from the step configuration requirements component (206) before being passed to the configuration code generator (208) where the configuration values are used to produce (404) the step configuration file (204).

The configuration code generator (208) produces (404) the step configuration file (204), which is input (405) to the configuration code interpreter (210) and to the metaprogramming component (224) of the execution code interpreter (210). The step macro's current configuration state is saved (407) to the source control repository (110) that records its current state. This can then be loaded and viewed in an Integrated Developer Environment (IDE). The step configuration file (204) is saved (408) to the source control repository (110), and optionally loaded (409) from the source control repository (110) to render (403) the flow in a graph in the user interface.

The execution process is then carried out as follows. To actually be able to run a step, it needs to be compiled into a compiled step file (222) and loaded into memory. To do this, the step configuration file (204) is passed (406) into the execution code generator (220) where it is input, along with shared functions (410) from the shared library (108) and any step specific functions (411) from the step specific component (225) that the step author added to the execution code generator (220) of the step macro (106).

The metaprogramming functions of the metaprogramming component (224) combine these inputs to create a compiled step file (222) with multiple execution functions (226) that can be used by the software to generate: runtime results (416), warnings and errors (417), documentation (418), and other specific execution modes (419) that can be used in different ways.

Figure 5:
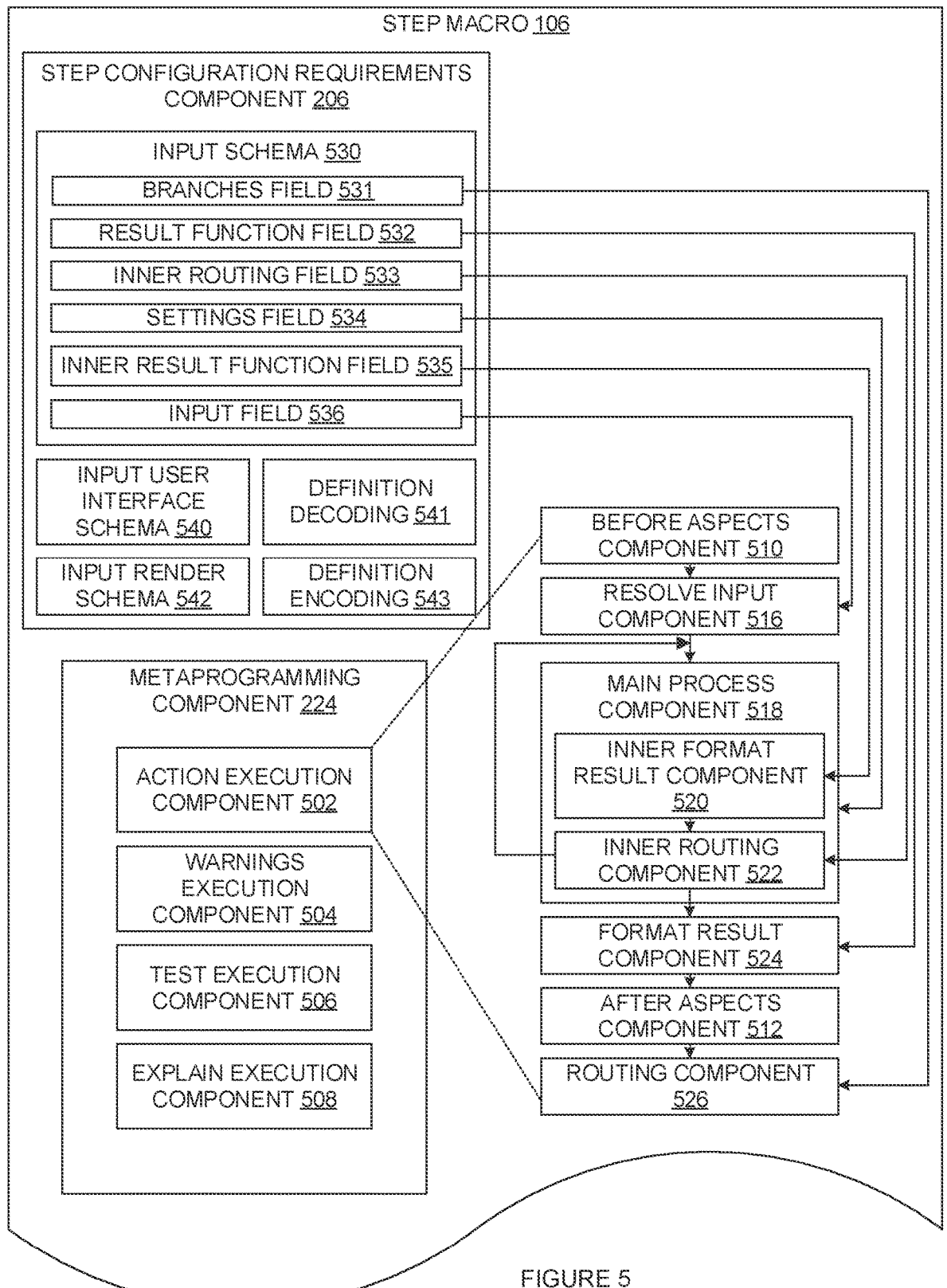
FIG. 5 is a block diagram which schematically illustrates an example step macro according to aspects of the present disclosure.

FIG. 5 is a block diagram which schematically illustrates an example configuration of a step macro (106) according to aspects of the present disclosure. The code representing a step (and e.g., contained in a step configuration file) may include a number of fields. These fields may form part of an input schema (530) which may form a part of or otherwise be accessible to a step configuration requirements component (206) of a step macro (106). The input schema (530) may be a JSON input schema. The input schema may include different fields, which may vary depending on the type of step macro.

In order to visualize the code in a way that maximizes usability and comprehension, there are a number of aspects that need to be drawn together on the same canvas of the user interface, each with their own considerations and level of detail. These main aspects include:
  1. Timing (order of execution);
  2. Paths (various branches that could be taken);
  3. Parallelism (concurrent processes);
  4. Dependency (variable scope and input sources);
  5. Opportunities to edit (adding, removing, moving steps);
  6. Modularity and encapsulation (steps inside steps, simplification of complex code);
  7. Cross-cutting aspects (overlays);
  8. Available settings and options (schema forms);
  9. Design time feedback (warnings, setting validation, geometric restrictions);
  10. Runtime feedback (debugging, step highlighting, repeating sections);
  11. Continual Context (always connected functions that return, no loose ends); and
  12. Deterministic (provided by, known-non-determinism).

The input schema (530) may for example include a branches field (531), e.g., 'branch', which may include information used by the system to route the flow to two or more paths based on the result of the step.

The input schema (530) may include a result function field (532), e.g., 'result_function', which may include information used by the platform/computing system to override the default behavior with respect to what is emitted by the step as a result.

The input schema (530) may include an inner routing field (533), e.g., 'inner_result_routing', which may include information used by the platform/computing system to route intra-step logic. Some types of termination (e.g., recursive with exit and recursive without exit) can be configured with the 'inner_result_routing' function.

The input schema (530) may include a settings field (534), 'settings', which may include information used by the platform/computing system to change the behavior of the step and which may be used during compilation and/or runtime. Example characteristics that can be configured through settings include, configuration, type of termination (e.g., with exit, endless, etc.).

The input schema (530) may include an inner result function field (536), e.g., 'inner_result_function', which may include information which supplements the 'inner_result_routing', e.g., by overriding which inner result is used when implementing inner routing.

The input schema (530) may include an input field (536), e.g., 'input', which may include information used by the platform/computing system to fetch and pass in the required input for the step at runtime.

The input schema (530) may also include 'use' and 'inner' fields. The 'use' field may for example specify the step type and may e.g., be directly associated with a software module configured to adhere to a specific behavior and interface so as to be compatible with the platform as well as any necessary metaprogramming needed to compile the step into functional code. The 'inner' field may for example specify any sub-steps that should be run inside a step and/or in-between steps, if applicable.

Other general settings can be added to a step and must conform to the shape expected by the specific step type according to the 'use' field. This provides an area for a step author to be creative and provide unique capabilities and configuration opportunities. These settings are typically made static when compiling to improve performance and reduce unnecessary code and computation. If a user wants to change these settings, a recompilation will occur on the fly and new requests will make use of the newly compiled code.

The step configuration requirements component (206) may include or otherwise be configured to access other schemas and definitions, such as an input user interface schema (540) that may be used to provide the user interface with the component types to display for each field, and an input render schema (542) that may contain custom component types that override the default ways to render a specific field type. The step configuration requirements component (206) may be configured to generate one or both of a definition decoding (541) and a definition encoding (543).

FIG. 5 also illustrates example components for generating the compiled step file (222) by a metaprogramming component (224) of a step macro according to various embodiments described herein. As mentioned in the foregoing, the metaprogramming component (224) may receive as input a step configuration file (204) and may be configured to generate and output code in the form of a compiled step file (222). The code generated by the step metaprogramming component (224) may be configured to be run in various modes and may therefore include various components or functions for each of the various modes. The compiled step file (222) may for example include an action execution component (502), a warnings execution component (504), a test execution component (506), an explain execution component (508) and the like. These execution components may be used to create additional tools for interacting with the step macro (106). For example, the warnings execution component (504) may be configured to generate a visual view of steps in a flow that have warnings or errors. The test execution component (506) may be configured for use by an external software testing suite in order to test the live code in a sandbox environment without modifying real data. The explain execution component (508) may be configured to automatically generate human readable documentation of the configuration and functions of the running step macro (106). Additional execution components can be added to extend additional functionality.

The action execution component (502) may include various sub-components. The action execution component (502) may for example include one or more aspects components, such as a before aspects component (510) and an after aspects component (512), which may be configured to add additional logic before or after the compiled step is run, as the case may be. Aspects components may be arranged for adding cross-cutting concerns to the steps, such as logging, metrics, security or any other extra dimension that can be applied alongside the flow graph that does not affect the primary logic of the flow graph. The aspects components may be controlled at runtime and do not necessarily form part of the flow graph, although adding initial values to the definition may be preferable and is supported.

Sub-components of the action execution component may be generated based on fields of the input schema. The arrangement of the sub-components may define the order in which associated blocks of code are executed by a processor of a computing system. For example, the action exaction component may include a resolve input component (516) which may be generated based on the input field (536) of the input schema. The action execution component may include a main process component (518).

Inputs are resolved by the resolve input component (516) within steps by taking the input field (536) and passing it into a module whose job is to resolve the setting into a value at runtime. This input module contains a list of specific strategies available to the user when configuring the step, each of these have their own backing module in the shared library (108) which contains the specific code that will return the value needed at runtime. The input strategies can be extended, enhanced or customized depending on the step.

The main process component (518) may be that part of a step where most of the differentiation occurs, e.g., this process may be unique per step type, while the others (e.g. the resolve input component (516), format result component (524), routing component (526), etc.) may be similar to others. The main process component (518) may for example include an inner format result component (520), which may be based on a result function field (532), and passed to an inner routing component (522) which may be based on an inner routing field (533) for routing. In the case of inner steps, a sequence step may for example start by executing or running inner steps in sequence after which next or following steps may be executed or run. Such next or following steps are not included in the inner field but rather, e.g., in the sequence of a parent (of which the current sequence may have no awareness).

The action execution component (502) may include components that modify or re-format the input values in the form of a before aspects component (510) and a resolve input component (516), which may be applied to the input defined in the input field (536) of the step macro. This input may for example be passed to the main process component (518) that performs the required executable code logic as defined in a settings field (534) which may be re-formatted by an inner format result component (520) as defined by an inner result function field (535) and passed to an inner routing component (522) generated based on an inner routing field (533). After the conditions of the inner routing component (522) are no longer met, a format result component (524) which may be generated based on result function field (532) may then modify the result of the main process component (518). The format result component (524) may be referenced in the branches field (531) and run through an after aspects component (512) for further processing before being used by the routing component (526) to modify the routing of what or if the next action executable code (502) of another step (i.e. another completely separate executable component that has been created by another step macro) should be run.

The following table summarizes the step characteristics and fields and their role in the compilation:

| Step Characteristics | Definition field | Role in compilation |
| --- | --- | --- |
| (can influence any/all) | use | Module target |
| Serial | inner | Run inner steps |
| Parallel | | |
| Branching (routing) | branch | Compile result paths |
| Receiving input | input | Resolve input |
| Emitting a result | result_function | Override result |
| Being configured | settings | Configure, affect compilation |
| With exit | | |
| Endless (stream) | | |
| Recursive with exit | inner_result_routing | Compile inner routing paths |
| Recursive without exit | | |

As execution code generator (220) starts to compile the flow from the step definitions, it will start with the 'root' step and process inner steps recursively until all steps are compiled in a logical structure. When compiling each step, the details of what to do (i.e. how to compile) are delegated to the respective step module as indicated by the use field.

Advantages provided by the present disclosure may include: changing flow options during execution; making data from previous steps available as input to later steps; having flows wait for responses from agents depending on strategy (and allowing strategies to be interchangeable without impacting the flow); handling replies via channels; communication between computing servers and reciprocal roles; and compiling a single JSON schema from a set of modules.

Aspects of the present disclosure may thus enable interchangeable strategies without impacting the flow. Aspects of the present disclosure may enable configuration of a response and an effect so as to separate the way in which an output is requested from the specific output that is requested to provide the ability to use different strategies. For example, a specific output could be requested from any agent, the first five agents who react, all agents who react, the cheapest agent to react, or the like, without affecting the flows requirement of asking the role to fulfil the reaction.

Figure 6A:
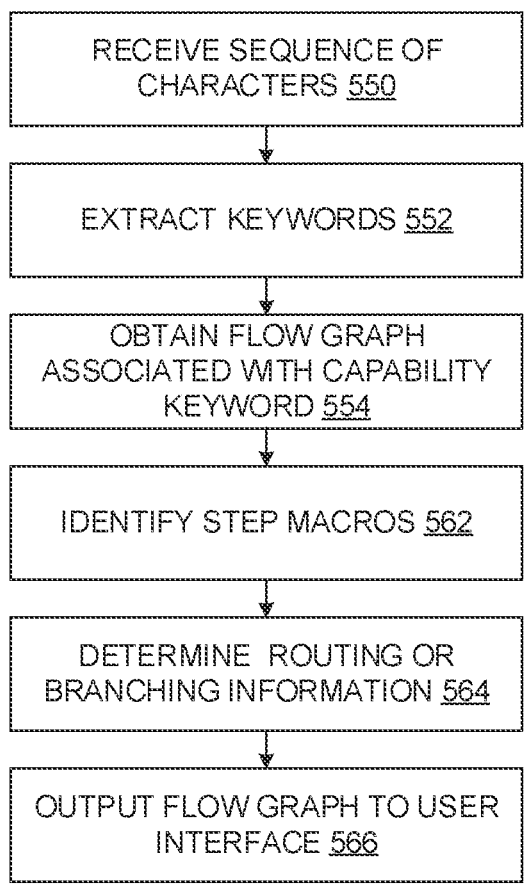
FIG. 6A is a flow diagram which illustrates an example embodiment of a method for executable code generation according to aspects of the present disclosure.

FIG. 6A is a flow diagram which illustrates an example embodiment of a method for executable code generation according to aspects of the present disclosure. The method may be conducted by a computing device executing a low-code development platform, such as the platform described in the foregoing.

The method includes receiving (550) a sequence of characters. The sequence of characters may represent a user story. The sequence of characters may be received in the form of a string or other suitable data type. One example sequence of characters representing a user story is "The system shall allow the tournament director to assign umpires for matches." Another example is "The system must create singles draws from registered singles players."

Figure 6B:
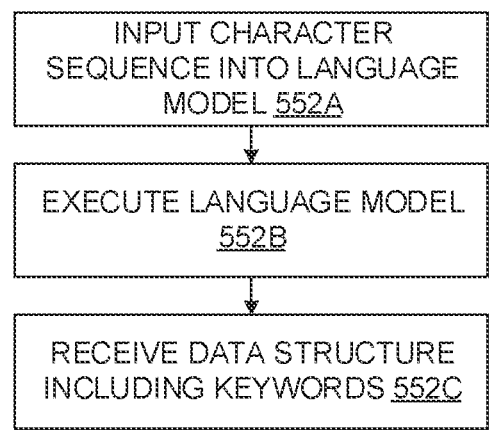
FIG. 6B is a flow diagram which illustrates example operations for extracting keywords according to aspects of the present disclosure.

The method includes extracting (552) one or more keywords from the sequence of characters. The extracted keywords at least include a capability keyword but may also include a role keyword and/or a benefit keyword. Extracting the one or more keywords may include using a language model to extract the keywords. Extracting the one or more keywords may for example include, with reference to FIG. 6B, inputting (552A) the character sequence into the language model, executing (552B) or running the language model and receiving (552C) as an output from the language model a data structure including the keywords. The data structure may be a schema (such as a JSON schema, an XML schema or the like) which maps each of the one or more keywords to one of a role or action. In some embodiments, the output may include a mapping or listing of any inputs or outputs that may be derived from any one of the keywords.

An example schema for the first example character sequence (from which the capability keyword "assign umpire" and role keyword "director" are extracted) may be:
{
"role": "director",
"action": "assign_umpire",
"action inputs": [
"umpire_id",
"match id"
]
}

An example schema for the second example character sequence (from which the capability keyword "create singles draws" is extracted) may be:
{
"role": "none",
"action": "create singles draws",
"action inputs": [
"player id"
]
}

Figure 6C:
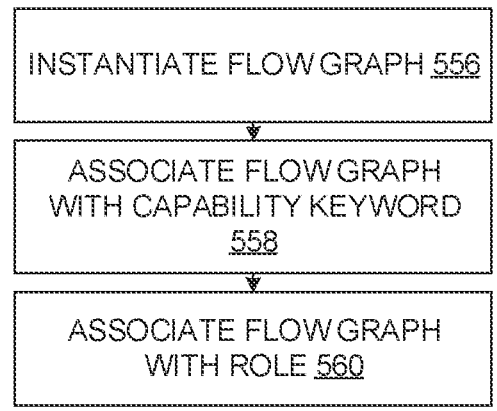
FIG. 6C is a flow diagram which illustrates example operations for obtaining a flow graph according to aspects of the present disclosure.

The method includes obtaining (554) a flow graph associated with the capability keyword. This may include, with reference to FIG. 6C, generating or instantiating (556) the flow graph. The flow graph may be an empty flow graph which includes no steps. Obtaining the flow graph associated with the capability keyword may include associating (558) the flow graph with the capability keyword, for example by naming the flow graph using the keyword. In some cases, if a role keyword is extracted from the character sequence, the obtaining the flow graph may include associating (560) the flow graph with a role based on the role keyword extracted from the sequence of characters. This may include assigning the flow graph to the role, for example including configuring identity management for access to resources of the flow graph based on the role with which it is associated.

In some embodiments, the method may include identifying (562) one or more step macros for one or more steps for inclusion in the flow graph. Each of the one or more step macros may be associated with the user story and may have been identified based on the one or more keywords extracted from the sequence of characters. The method may include determining (564) routing or branching information for the step based on the one or more keywords. Identifying one or more step macros may include using a learning component having been trained by matching steps in flows in historical flow graphs. Identifying one or more step macros may include using a wizard component and user input received via the wizard component.

The method includes outputting (566) the flow graph to a user interface (102) for configuration by a user. Configuration may include the adding and configuration of steps by a user using step macros available from the library of step macros. In embodiments in which step macros and/or routing and branching information is determined, configuration by the user may include further configuration of each of one or more steps in the flow graph. In such embodiments, outputting the flow graph may include rendering and interconnecting the one or more steps visually as graphical elements in a flow graph editor of the user interface.

Referring to FIGS. 7A to 7C, exemplary user interfaces (300) illustrate configuration of the step macro (106) by a user. The user interface (300) may include a list of flow steps (302) which are step macros that can be and/or are already input into a flow graph (304) via a flow graph editor (306). Configured step macros in the flow graph may be rendered visually as graphical elements (303) which can be interconnected and manipulated in the flow graph by the user via the flow graph editor, etc. to generate a step configuration file. Code (308) relating to a selected step (303) in the user interface can be viewed in a code viewing/editing tab (310) of the user interface (300). The code (308) that is displayed may be code stored in the step configuration file (204) and may therefore represent a specific instance of the step macro defined in terms of the step's interconnection and configuration in the flow graph (304). A details tab (312) of the user interface (300) may represent a graphical rendering of the fields for data point entry defined by the step macro (106), e.g., in the step configuration requirements component (206). The details tab may be rendered by the configuration code interpreter (210) according to the display rules of the step configuration requirements component (206). The details tab may include graphical renderings of the fields in the form of prompts (314) and input fields (316) via which data points can be input for validation and configuration of the step macro. The user interface (300) may thus provide inputs and outputs via which a user can connect and configure different types of step macros in order to build flow graphs that are ultimately rendered, e.g., through each step macro's execution code generator, into executable code that can be stored in memory and executed by a processor of a computing system.

The low-code development platform described herein may be provided for use in developing or creating computer programs, application software and/or software systems. A software system may for example include several separate computer programs and associated configuration files, documentation, etc., that operate together.

Aspects of the present disclosure provide a low-code development platform in which operating spaces can be created and described in a descriptor language, such as JSON (or any other similar method of description, such as XML or others). The description may include, inter alia: each role that could be enacted by one or more persons (whether a natural person or a system-based person) within that specific operating space; each action (which may be derived from a user story), that can be undertaken by one or more of the roles; the specific flow that would enact the action of each role within an operating space; each individual person that has rights to participate in an operating space may be assigned to one or more of the specified roles within that operating space. Each individual person within a parent operating space may, additionally, be assigned rights to roles within any number of descendant operating spaces. Each operating space can also maintain its own groups of computer-managed files, notes, tasks, and instant messaging chat in the form of private one-on-one chat rooms, as well as group chat rooms. Each of these elements may have, optionally, strictly imposed IAM (Identity and Authentication Management) rules to maintain access to appropriate parties (e.g., based on roles to which that party is assigned). The structure of each operating space, is, specifically, roles, actions that are enacted by flows, which in turn connect to services that have adapters registered within a service registry. As this structure creates reactive events, which can be tracked via an analytic system, it is envisaged that a number of standard metrics will be tracked in an analytic system. As mentioned above, an operating space is comprised of many elements. Each element is described in a file format such as source code, JSON objects, resource files, and so on. At any point in time the version, based on the aggregate of its content, is an immutable description of the operating space. Each element of an operating space may be linked to each other, for example by hashing every immutable content element and assigning the hashes to a Merkle Tree. In a similar way, each operating space may be linked to every other operating space. This may allow an element or file or other relevant data structure to be checked against the Merkle root to verify authenticity.

Figure 8:
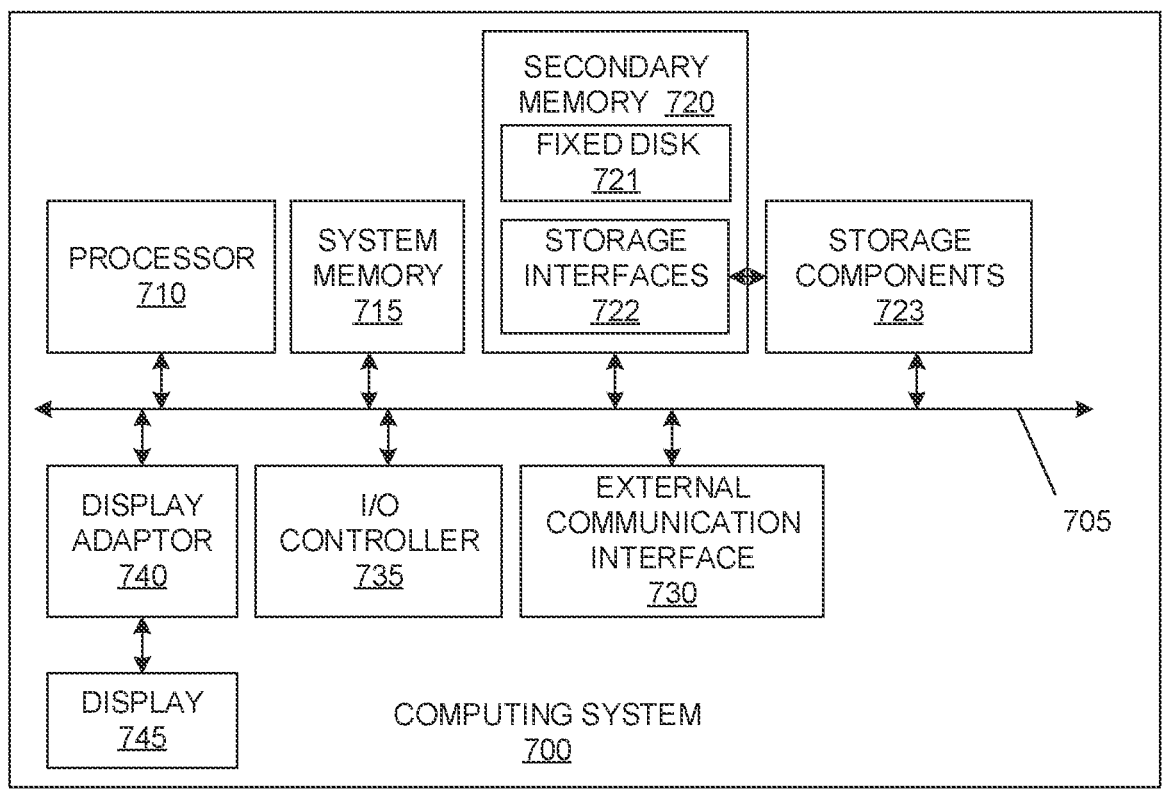
FIG. 8 illustrates an example of a computing system in which various aspects of the disclosure may be implemented.

FIG. 8 illustrates an example of a computing system (700) in which various aspects of the disclosure may be implemented. The computing system (700) may be embodied as any form of data processing device including a personal computing system (e.g., laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing system may dictate the inclusion or exclusion of various components or subsystems described below.

The computing system (700) may be suitable for storing and executing computer program code. The various participants and elements in the previously described system diagrams may use any suitable number of subsystems or components of the computing system (700) to facilitate the functions described herein. The computing system (700) may include subsystems or components interconnected via a communication infrastructure (705) (for example, a communications bus, a network, etc.). The computing system (700) may include one or more processors (710) and at least one memory component in the form of computer-readable media. The one or more processors (710) may include one or more of: CPUs, graphical processing units (CPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing system (700) may be distributed over a number of physical locations (e.g., in a distributed, cluster or cloud-based computing configuration) and appropriate software units may be arranged to manage and/or process data on behalf of remote devices.

The memory components may include system memory (715), which may include read only memory (ROM) and random-access memory (RAM). A basic input/output system (BIOS) may be stored in ROM. System software may be stored in the system memory (715) including operating system software. The memory components may also include secondary memory (720). The secondary memory (720) may include a fixed disk (721), such as a hard disk drive, and, optionally, one or more storage interfaces (722) for interfacing with storage components (723), such as removable storage components (e.g., magnetic tape, optical disk, flash memory drive, external hard drive, removable memory chip, etc.), network attached storage components (e.g. NAS drives), remote storage components (e.g. cloud-based storage) or the like.

The computing system (700) may include an external communications interface (730) for operation of the computing system (700) in a networked environment enabling transfer of data between multiple computing systems (700) and/or the Internet. Data transferred via the external communications interface (730) may be in the form of signals, which may be electronic, electromagnetic, optical, radio, or other types of signal. The external communications interface (730) may enable communication of data between the computing system (700) and other computing systems including servers and external storage facilities. Web services may be accessible by and/or from the computing system (700) via the communications interface (730).

The external communications interface (730) may be configured for connection to wireless communication channels (e.g., a cellular telephone network, wireless local area network (e.g., using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (710). A computer program product may be provided by a non-transient or non-transitory computer-readable medium or may be provided via a signal or other transient or transitory means via the communications interface (730).

Interconnection via the communication infrastructure (705) allows the one or more processors (710) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing system (700) either directly or via an I/O controller (735). One or more displays (745) (which may be touch-sensitive displays) may be coupled to or integrally formed with the computing system (700) via a display or video adapter (740).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random-access memory (RAM), a read-only memory (ROM), a magnetic medium such as a hard-drive, or an optical medium such as a CD-ROM. Any such computer-readable medium may also reside on or within a single computational apparatus and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method of executable code generation using a low-code development platform including a user interface and having access to a library of step macros configured for user configuration and interconnection via the user interface, the method comprising:
   receiving and extracting from a sequence of characters, one or more keywords at least including a capability keyword;
   obtaining a flow graph associated with the capability keyword;
   outputting the flow graph to the user interface for configuration by a user of each of one or more steps in or added to the flow graph, each of which is associated with a step macro, including configuring user-configurable data points of the step macro for generating a step configuration file based on the user-configurable data points;
   generating the step configuration file based on the user-configurable data points; and
   generating executable code in the form of a compiled step file configured for storage in memory and execution by a processor of a computing system, the generating including:
   interpreting the user-configurable data points of the step configuration file to generate and output the compiled step file.

2. The method as claimed in claim 1, wherein generating the step configuration file includes:
   providing fields for receiving data points for configuration of the step macro; and
   providing display and validation rules configured to define how the user interface displays and validates data points input into the fields via the user interface.

3. The method as claimed in claim 1, including generating configuration values based on validated data points, wherein the configuration values are JSON configuration values.

4. The method as claimed in claim 3, including converting the configuration values into configuration code based on the validated data points.

5. The method as claimed in claim 1, including storing the step configuration file in a source control repository, wherein the source control repository is a version control repository.

6. The method as claimed in claim 1, including defining a graphical element based on the step configuration file, wherein the graphical element is configured for display and user manipulation via the user interface.

7. The method as claimed in claim 1, including accessing shared functions via a shared library and wherein generating executable code receives and inputs one or more shared functions together with the step configuration file for interpreting in order to generate the compiled step file.

8. The method as claimed in claim 1, wherein interpreting the user-configurable data points of the step configuration file includes interpreting the user-configurable data points of the step configuration file with the step macro to generate and output the compiled step file.

9. The method as claimed in claim 1, wherein the sequence of characters represents a user story.

10. The method as claimed in claim 1, wherein receiving the sequence of characters includes receiving the sequence of characters extracted from a document.

11. The method as claimed in claim 1, wherein receiving the sequence of characters includes receiving the sequence of characters input by a user of the platform.

12. The method as claimed in claim 1, wherein extracting the one or more keywords includes using a language model.

13. A computer program product for executable code generation using a low-code development platform including a user interface and having access to a library of step macros configured for user configuration and interconnection via the user interface, the computer program product comprising a non-transitory computer readable storage medium having program instructions embodied therewith, the program instructions executable by a processor to cause the processor to:
  receive and extract from a sequence of characters, one or more keywords at least including a capability keyword;
  obtain a flow graph associated with the capability keyword;
  output the flow graph to the user interface for configuration by a user of each of one or more steps in or added to the flow graph, each of which is associated with a step macro, including configuring user-configurable data points of the step macro for generating a step configuration file based on the user-configurable data points;
  generate the step configuration file based on the user-configurable data points; and
  generate executable code in the form of a compiled step file configured for storage in memory and execution by a processor of a computing system, the generating including:
    interpreting the user-configurable data points of the step configuration file to generate and output the compiled step file.

14. A computing system for executable code generation using a low-code development platform including a user interface and having access to a library of step macros configured for user configuration and interconnection via the user interface, the computing system comprising a memory that stores instructions that provide components of the platform and one or more processors to execute the instructions so as to perform the steps of:
  receiving and extracting from a sequence of characters, one or more keywords at least including a capability keyword;
  obtaining a flow graph associated with the capability keyword;
  outputting the flow graph to the user interface for configuration by a user of each of one or more steps in or added to the flow graph, each of which is associated with a step macro, including configuring user-configurable data points of the step macro for generating a step configuration file based on the user-configurable data points;
  generating the step configuration file based on the user-configurable data points; and
  generating executable code in the form of a compiled step file configured for storage in the memory and execution by a processor of the or another computing system, the generating including:
    interpreting the user-configurable data points of the step configuration file to generate and output the compiled step file.

15. The computing system as claimed in claim 14, wherein each step macro comprises:
  a step configuration generator configured to generate the step configuration file; and
  an execution code generator configured to generate executable code in the form of the compiled step file, wherein the execution code generator receives and inputs the step configuration file into a metaprogramming component configured to interpret the user-configurable data points of the step configuration file and to generate and output the compiled step file.

16. The computing system as claimed in claim 15, wherein the step configuration generator includes a step configuration requirements component including fields for receiving data points for configuration of the step macro as well as display and validation rules configured to define how the user interface displays and validates data points input into the fields via the user interface.

17. The computing system as claimed in claim 16, wherein the step configuration requirements component generates configuration values based on validated data points, wherein the configuration values are JSON configuration values.

18. The computing system as claimed in claim 17, wherein the step configuration generator includes a configuration code generator configured to convert the configuration values into configuration code based on the validated data points.

19. The computing system as claimed in claim 15, wherein the step configuration generator includes a configuration code interpreter configured to define a graphical element based on the step configuration file, wherein the graphical element is configured for display and user manipulation via the user interface.

20. The computing system as claimed in claim 15, wherein the execution code generator has access to shared functions via a shared library and wherein the execution code generator receives and inputs one or more shared functions into the metaprogramming component together with the step configuration file in order to generate the compiled step file.

* * * * *